US006879555B2

(12) United States Patent
Takeuchi (10) Patent No.: US 6,879,555 B2
(45) Date of Patent: Apr. 12, 2005

(54) OPTICAL DISC APPARATUS FOR DISCRIMINATING TYPE OF OPTICAL DISK, AND METHOD THEREFOR

(75) Inventor: Kazuhiro Takeuchi, Touyo (JP)

(73) Assignee: Matsushita Electric Industrial Co., Ltd. (JP)

( * ) Notice: Subject to any disclaimer, the term of this patent is extended or adjusted under 35 U.S.C. 154(b) by 505 days.

(21) Appl. No.: 10/018,477

(22) PCT Filed: Apr. 16, 2001

(86) PCT No.: PCT/JP01/03254

§ 371 (c)(1),
(2), (4) Date: Dec. 19, 2001

(87) PCT Pub. No.: WO01/86645

PCT Pub. Date: Nov. 15, 2001

(65) Prior Publication Data

US 2002/0159363 A1 Oct. 31, 2002

(30) Foreign Application Priority Data

Apr. 21, 2000 (JP) ........................................ 2000-120196

(51) Int. Cl.$^7$ ................................................. G11B 7/09
(52) U.S. Cl. ................................. 369/53.23; 369/53.28
(58) Field of Search ........................... 369/53.23, 53.28

(56) References Cited

U.S. PATENT DOCUMENTS

| 5,745,461 | A | * | 4/1998 | Kawasaki | 369/53.23 |
| 5,903,531 | A | * | 5/1999 | Satoh et al. | 369/44.29 |
| 5,917,791 | A | | 6/1999 | Tsuchiya et al. | |
| 6,141,307 | A | * | 10/2000 | Yoshioka | 369/53.22 |
| 6,608,804 | B2 | * | 8/2003 | Shim | 369/53.22 |
| 6,628,591 | B1 | * | 9/2003 | Yokota et al. | 369/53.21 |
| 6,747,931 | B1 | * | 6/2004 | Park | 369/53.23 |

FOREIGN PATENT DOCUMENTS

| EP | 0 910 079 | | 4/1999 |
| JP | 61258367 | A | 11/1986 |
| JP | 06314465 | A | 11/1994 |
| JP | 09245422 | A | 9/1997 |
| JP | 10-74356 | | 3/1998 |
| JP | 10340526 | A | 12/1998 |
| JP | 11120683 | A | 4/1999 |
| JP | 11-203691 | | 7/1999 |
| JP | 11-213530 | | 8/1999 |
| JP | 11353786 | A | 12/1999 |
| JP | 2000100059 | A | 4/2000 |
| JP | 2000-315355 | | 11/2000 |
| JP | 2001-210004 | | 8/2001 |

OTHER PUBLICATIONS

Translation of JP 11–203691 from JPO website http://www.ipdl.jpo.go.jp/homepg_e.ipdl.*
"Detection of Optical Disk Type," IBM Technical Disclosure Bulletin, vol. 29, No. 3, Aug. 1986, pp 995–996, IBM Corp. 1986.

* cited by examiner

Primary Examiner—Brian E. Miller
Assistant Examiner—Michael V. Battaglia
(74) Attorney, Agent, or Firm—Parkhurst & Wendel, L.L.P.

(57) ABSTRACT

According to the present invention, it is possible to accurately start an optical disc apparatus and to reduce a startup time therefor, and it is possible to securely and accurately reproduce/record information with respect to a plurality of types of optical discs in accordance with the type. According to the present invention, by calculating a threshold value of quantity of reflected light for discriminating the type of optical disc on a basis of a measured value of quantity of reflected light from an optical disc of high reflectivity such as CD-ROM and CD-R and a measured value of quantity of reflected light from an optical disc of low reflectivity such as CD-RW to update the threshold value, the type of the optical disc loaded into the optical disc apparatus is discriminated securely and in short time.

20 Claims, 9 Drawing Sheets

OPTICAL DISC APPARATUS FOR DISCRIMINATING TYPE OF OPTICAL DISK, AND METHOD THEREFOR

FIELD OF THE INVENTION

The present invention relates to an optical disc apparatus and an optical disc discriminating method for recording or reproducing a plurality of types of optical discs having different reflectivities such as CD-ROM, CD-R and CD-RW, for example.

BACKGROUND ART

In recent years, CDs (compact discs) are widely used as optical discs which are recording media of digital information. Optical discs using such CD systems are used in various fields, typically in audio systems and computer systems, as recording media of various types of data.

Among these optical discs using CD systems, a CD-ROM has assumed a dominant position in early stages, however, in recent years, a write-once optical disc called a CD-R (compact disc-recordable) and a rewritable optical disc called a CD-RW (compact disc-rewritable) have also been commercialized. Thus, diversification of optical discs and expansion in specification and application have dramatically increased.

In response to the commercialization of a plurality of types of optical discs, it is necessary to provide optical disc apparatuses capable of responding to the a plurality of types of optical discs as well as having compatibility with conventional optical discs.

Generally speaking, in CDs, a ratio of reflected light with respect to incident light, i.e., a reflectivity differs depending on the structure of a signal recording layer of the optical disc. Therefore, the reflected light obtained from a pickup device, i.e., the signal level of an RF signal differs depending on the type of optical disc. Using this difference in signal level, the type of optical disc, that is, CD-ROM, CD-R or CD-RW can be discriminated. The reflectivities of the respective types of optical discs are determined as follows: 0.7 or more for CD-ROM, 0.65 or more for CD-R and 0.15 to 0.25 for CD-RW.

Also, in recordable optical discs such as CD-R and CD-RW, a guide groove for tracking at the time of recording is provided, in which guide groove, time information and identification information of the optical disc, and property of the recording medium and the like are recorded as ATIP (absolute time in pre-groove) information. In particular, by reading out disc type identification information recorded as one of identification information of the disc, it is possible to discriminate the type of the optical disc between CD-R and CD-RW, for example. Furthermore, as for CD-ROM, since the ATIP information itself does not exist, it is possible to achieve type discrimination from a read-only optical disc such as CD-ROM.

In the manner as described above, it is possible to discriminate the type of optical disc. To be more specific, in the optical disc apparatus capable of responding to a plurality of types of optical discs, by making discrimination using combination of the reflectivity and the disc type identification information as described above at the time when the optical disc is loaded, which type of optical disc was loaded is discriminated.

Furthermore, on the basis of this discrimination result, the optical disc apparatus makes settings of optimum values of parameters in various kinds of servo systems such as focus servo and tracking servo and a laser power.

In the above mentioned prior art, however, since the reflected light from the optical disc varies depending on the manufacturer of the optical disc, it is difficult to determine a threshold value of quantity of reflected light for discriminating the type of optical disc by a fixed threshold value which is common among different manufacturers. For example, when an optical disc is provided by a newly entered optical disc manufacturer, there arises a case that discrimination results of the optical disc differ between the discrimination result based on the reflectivity and the discrimination result based on the disc type identification information. In such a case, the type of the optical disc is determined by giving a priority to the discrimination result based on the disc type identification information. However, it was necessary to make settings of optimum values of parameters in various kinds of servo systems such as focus servo and tracking servo and a laser power again with respect to that optical disc after the above determination.

In brief, a threshold value of quantity of reflected light for discriminating the type of optical disc is fixed regardless of the manufacture of the optical disc. For this reason, as described above, when an optical disc is loaded to the optical disc apparatus, setting of parameters of various kinds of servo systems and laser power is necessarily conducted twice, which leads the problem that the startup time of the optical disc increases.

Furthermore, when the discrimination results of the optical disc differ between the discrimination of the optical disc based on the reflectivity and the discrimination of the optical disc based on the disc type identification information, the type of the optical disc is determined by giving a priority on the latter discrimination result of the optical disc. Therefore, there is a problem that depending on the manufacturer of the optical disc, recording/reproducing operation with respect to the optical disc is carried out under the condition of erroneous discrimination result of the optical disc, so that the operation is not accurately carried out.

DISCLOSURE OF INVENTION

The present invention solves the above-mentioned problems of the prior art, and provides an optical disc apparatus and an optical disc discriminating method capable of accurately starting the optical disc apparatus and reducing the startup time, as well as reproducing/recording information of a plurality of types of optical discs in accordance with the type of the optical discs securely and accurately.

In order to solve the above-mentioned problems, the optical disc apparatus and optical disc discriminating method according to the present invention are characterized by calculating a threshold value of quantity of reflected light for discriminating the type of optical disc, on the basis of a measured value of quantity of reflected light from an optical disc of high reflectivity such as CD-ROM and CD-R and a measured value of quantity of reflected light from an optical disc of low reflectivity such as CD-RW to update the threshold value, thereby discriminating the type of the optical disc loaded into the optical disc apparatus securely with high accuracy in short time, and setting the operation mode in accordance with the type of the optical disc on the basis of that discrimination.

In the manner as described above, it is possible to start the optical disc apparatus accurately and reduce its startup time, as well as to reproduce/record information of a plurality of types of optical discs in accordance with the type of the discs securely and accurately.

An optical disc apparatus according to claim 1 of the present invention comprises: a laser light source for emitting a laser beam for irradiating an optical disc surface via an objective lens; light detector for detecting reflected light by the optical disc surface of the laser beam emitted from the laser light source; focus controller for controlling a focus condition by moving the objective lens in a direction of optical axis in accordance with a focus error signal generated by the light detector; tracking controller for controlling a tracking condition by moving the objective lens in a horizontal direction in accordance with a tracking error signal generated by the light detector; disc signal discriminator for discriminating the type of the optical disc on a basis of a focus error signal and a sub beam addition signal obtainable in performing a focus search by moving the objective lens in the direction of optical axis by means of the focus controller; and disc information discriminator for discriminating the type of optical disc in accordance with information recorded on the optical disc, and is so configured that final discrimination of the type of optical disc is made on a basis of a type discrimination result of the optical disc by means of the disc signal discriminator and the type discrimination result by the disc information discriminator.

An optical disc discriminating method according to claim 13 is an optical disc discriminating method in an optical disc apparatus according to any one of claims 1 to 12, and is so configured that final discrimination of the type of optical disc is made on the basis of a type discrimination result of the optical disc by means of disc signal discriminator which discriminates the type of optical disc on the basis of a focus error signal and a sub beam addition signal obtainable in performing a focus search by moving an objective lens in a direction of optical axis; and the type discrimination result of the optical disc by disc information discriminator which discriminates the type of optical disc in accordance with information recorded on the optical disc.

According to these configurations and methods, by calculating a threshold value of quantity of reflected light for discriminating the type of optical disc on a basis of a measured value of quantity of reflected light from an optical disc of high reflectivity such as CD-ROM and CD-R and a measured value of quantity of reflected light from an optical disc of low reflectivity such as CD-RW to update the threshold value, the type of the optical disc loaded into the optical disc apparatus is discriminated securely and in short time.

In the optical disc apparatus according to claim 2, the optical disc apparatus according to claim 1 is so configured that the disc signal discriminator uses signal levels of the focus error signal and the sub beam addition signal as threshold data of quantity of reflected light for discriminating the type of optical disc.

In the optical disc apparatus according to claim 6, when the type of the optical disc discriminated by the disc information discriminator according to claim 5 is discriminated as the type of the optical disc inserted into the optical disc apparatus, signal levels obtained by the disc signal discriminator is adopted as a threshold value for discriminating the type of the optical disc used in the disc signal discriminator.

In the optical disc apparatus according to claim 7, when the type of the optical disc discriminated by the disc information discriminator according to claim 5 is discriminated as the type of the optical disc inserted into the optical disc apparatus, an intermediate value between a maximum value of one of the signal levels of optical disc and a minimum value of the other of the signal levels of optical disc obtained by the disc signal discriminator is adopted as a threshold value for discriminating the type of the optical disc used in the disc signal discriminator.

In the optical disc apparatus according to claim 8, the maximum value of one of the signal levels of optical disc obtained by the disc signal discriminator according to claim 7 is used as a maximum value of signal levels in the type of optical disc discriminated by the disc information discriminator.

In the optical disc apparatus according to claim 9, the minimum value of the other of the signal levels of optical disc obtained by the disc signal discriminator according to claim 7 is used as a minimum value of signal levels in the other type of optical disc not discriminated by the disc information discriminator.

In the optical disc apparatus according to claim 10, in the case where the type of optical disc discriminated by the disc information discriminator according to claim 5 is discriminated as the type of the optical disc inserted into the optical disc apparatus, an intermediate value between an average value of signal levels in one type of optical disc discriminated by the disc information discriminator and an average value of signal levels in the other type of optical disc discriminated by the disc signal discriminator is adopted as a threshold value for discriminating the type of the optical disc used in the disc signal discriminator.

In the optical disc apparatus according to claim 11, the average of signal levels in the type of optical disc discriminated by the disc signal discriminator according to claim 10 is determined by averaging a plurality of signal levels obtained in the type of optical disc discriminated by the disc signal discriminator.

In the optical disc apparatus according to claim 12, the average of signal levels in the type of optical disc discriminated by the disc information discriminator according to claim 10 is determined by averaging a plurality of signal levels obtained by the disc signal discriminator in the type of optical disc discriminated by the disc information discriminator.

In the optical disc discriminating method according to claim 14, in discriminating the type of optical disc by the disc signal discriminator according to claim 13, signal levels of the focus error signal and the sub beam addition signal are used as threshold data of quantity of reflected light for discriminating the type of optical disc.

In the optical disc discriminating method according to claim 18, when the type of optical disc discriminated by the disc information discriminator according to claim 17 is discriminated as the type of the optical disc inserted into the optical disc apparatus, signal levels obtained by the disc signal discriminator is adopted as a threshold value for discriminating the type of the optical disc used in the disc signal discriminator.

In the optical disc discriminating method according to claim 19, when the type of optical disc discriminated by the disc information discriminator according to claim 17 is discriminated as the type of the optical disc inserted into the optical disc apparatus, an intermediate value between a maximum value of one of the signal levels of optical disc and a minimum value of the other of the signal levels of optical disc obtained by the disc signal discriminator is adopted as a threshold value for discriminating the type of the optical disc used in the disc signal discriminator.

In the optical disc discriminating method according to claim 20, the maximum value of one of the signal levels of optical disc obtained by the disc signal discriminator according to claim 19 is used as a maximum value of signal levels in the type of optical disc discriminated by the disc information discriminator.

In the optical disc discriminating method according to claim 21, the minimum value of the other of the signal levels of optical disc obtained by the disc signal discriminator according to claim 19 is used as a minimum value of signal levels in the other type of optical disc not discriminated by the disc information discriminator.

In the optical disc discriminating method according to claim 22, when the type of optical disc discriminated by the disc information discriminator according to claim 17 is discriminated as the type of the optical disc inserted into the optical disc apparatus, an intermediate value between an average value of signal levels in one type of optical disc discriminated by the disc information discriminator and an average value of signal levels in the other type of optical disc discriminated by the disc signal discriminator is adopted as a threshold value for discriminating the type of the optical disc used in the disc signal discriminator.

In the optical disc discriminating method according to claim 23, the average of signal levels in the type of optical disc discriminated by the disc signal discriminator according to claim 22 is determined by averaging a plurality of signal levels obtained in the type of optical disc discriminated by the disc signal discriminator.

In the optical disc discriminating method according to claim 24, the average of signal levels in the type of optical disc discriminated by the disc information discriminator according to claim 22 is determined by averaging a plurality of signal levels obtained by the disc information discriminator in the type of optical disc discriminated by the disc information discriminator.

According to these configurations and methods, the accuracy of discriminating the type of the optical disc loaded into the optical disc apparatus is improved.

In the optical disc apparatus according to claim 3, the disc signal discriminator according to claim 1 discriminates whether the optical disc to be discriminated based on the focus error signal and the sub beam addition signal is a CD-ROM, a CD-R, a CD-RW or no disc.

In the optical disc discriminating method according to claim 15, in discriminating the type of optical disc by the disc signal discriminator according to claim 13, whether the optical disc to be discriminated based on the focus error signal and the sub beam addition signal is a CD-ROM, a CD-R, a CD-RW or no disc is discriminated.

According to these configurations and methods, setting of the operation mode in accordance with the type of optical disc on the basis of the discrimination by the disc signal discriminator is enabled.

In the optical disc apparatus according to claim 4, the disc information discriminator according to claim 1 discriminates whether the optical disc to be discriminated based on the information recorded on the optical disc is a CD-R, a CD-RW, or a CD-ROM.

In the optical disc discriminating method according to claim 16, in discriminating the type of optical disc by the disc information discriminator according to claim 13, whether the optical disc to be discriminated based on the information recorded on the optical disc is a CD-R, a CD-RW, or a CD-ROM is discriminated.

According to these configurations and methods, setting of the operation mode in accordance with the type of optical disc on the basis of the discrimination by the disc information discriminator is enabled.

In the optical disc apparatus according to claim 5, with regard to a loaded optical disc according to claim 1, in the case where the type of optical disc discriminated by the disc signal discriminator and the type of optical disc discriminated by the disc information discriminator are different from each other, a priority is given to the type of optical disc discriminated by the disc information discriminator.

In the optical disc discriminating method according to claim 17, with regard to a loaded optical disc according to claim 13, in the case where the type of optical disc discriminated by the disc signal discriminator and the type of optical disc discriminated by the disc information discriminator are different from each other, a priority is given to the type of optical disc discriminated by the disc information discriminator.

According to these configurations and methods, by setting the operation mode in accordance with the type of optical disc on the basis of the discrimination by the disc information discriminator, accurate starting with respect to a plurality of types of optical discs is enabled.

BEST MODE FOR CARRYING OUT THE INVENTION

In the following, an optical disc apparatus and an optical disc discriminating method representing a preferred embodiment of the present invention will be concretely explained with reference to the drawings.

First, sectional structures of a CD-ROM, a CD-R and a CD-RW to be loaded in the optical disc apparatus of the present embodiment will be explained with reference to FIGS. 1, 2 and 3.

Figure 1:
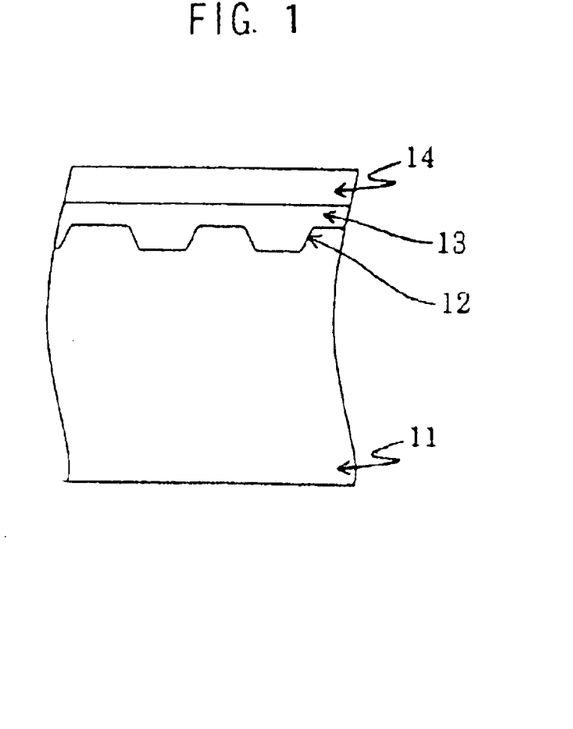
FIG. 1 is a sectional view showing a structure of an ordinary CD-ROM.

The CD-ROM shown in FIG. 1 is a read only medium and formed by a transparent disc substrate 11, a signal surface 12, a reflection layer 13 and a protection layer 14. Upon incidence of a laser beam from the side of the disc substrate 11 with respect to the CD-ROM, information recorded on the signal surface 12 is detected by means of the reflected light.

Figure 2:
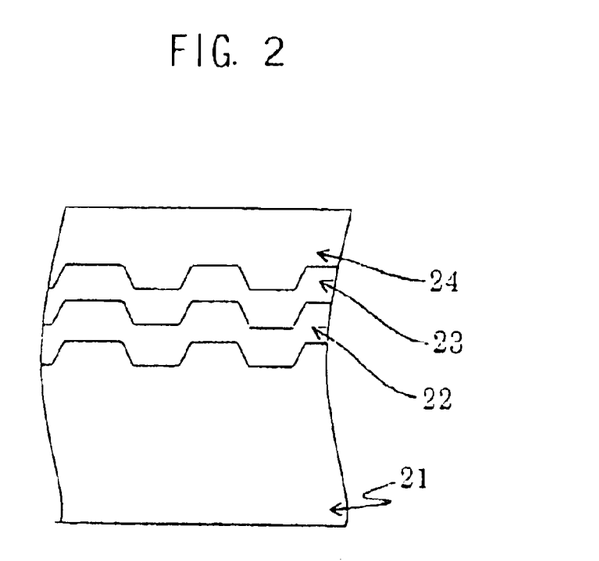
FIG. 2 is a sectional view showing a structure of an ordinary CD-R.

The CD-R shown in FIG. 2 is a write-once media, and formed by a transparent disc substrate 21, a recording layer 22, a reflection layer 23 and a protection layer 24.

For recording data on the CD-R, it is necessary to irradiate with an intense laser beam from the side of the disc substrate 21. The recording layer 22 irradiated with the intense laser beam absorbs the irradiated laser beam to generate heat because it contains an organic dye, and local temperature rise occurs. As a result of this temperature rise, the refractive index changes due to deformation of the disc substrate 21 and decomposition of the dye of the recording layer 22, thereby forming bits corresponding to the data to accomplish recording of the data.

Figure 3:
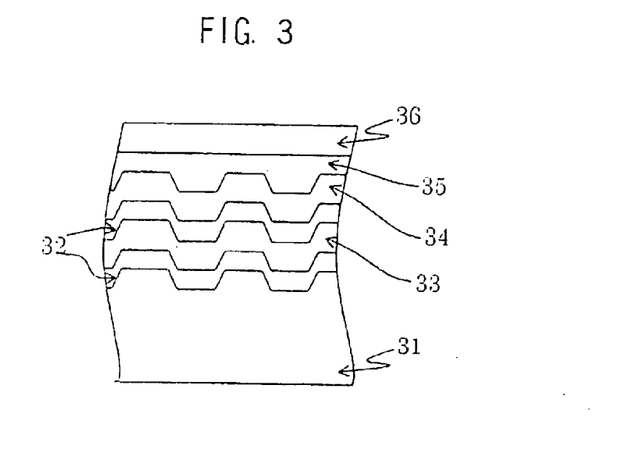
FIG. 3 is a sectional view showing a structure of an ordinary CD-RW.

The CD-RW shown in FIG. 3 is a medium which records or erases data by reversibly changing a phase change recording layer 33. This CD-RW is formed by a transparent disc substrate 31, a dielectric layer 32, the phase change recording 33, a reflection layer 34, a protection layer 35 and a special printing layer 36.

For recording data on the CD-RW, it is necessary to irradiate with a laser beam of relatively high power from the side of the disc substrate 31 to raise the temperature of the phase change recording layer 33 to high temperatures near the melting point, followed by rapidly cooling. As a consequence of this series of operations, a noncrystalline state is formed in the phase change recording layer 33, whereby recording of data is accomplished.

On the other hand, for erasing data, it is necessary to irradiate with a laser beam of relatively low power from the side of the disc substrate 31 to raise the temperature of the phase change recording layer 33 to a crystallization transition temperature, followed by slow cooling. As a consequence of this series of operations, a crystalline state changed from the noncrystalline state is formed in the phase change recording layer 33, whereby erasing of data is accomplished.

As described above, reflectivities of the respective types of optical disc are determined as 0.7 or more for CD-ROM, 0.65 or more for CD-R and 0.15 to 0.25 for CD-RW depending on the difference in structure of the signal recording layer of each optical disc.

Next, an optical disc apparatus of one embodiment of the present invention will be explained.

Figure 4:
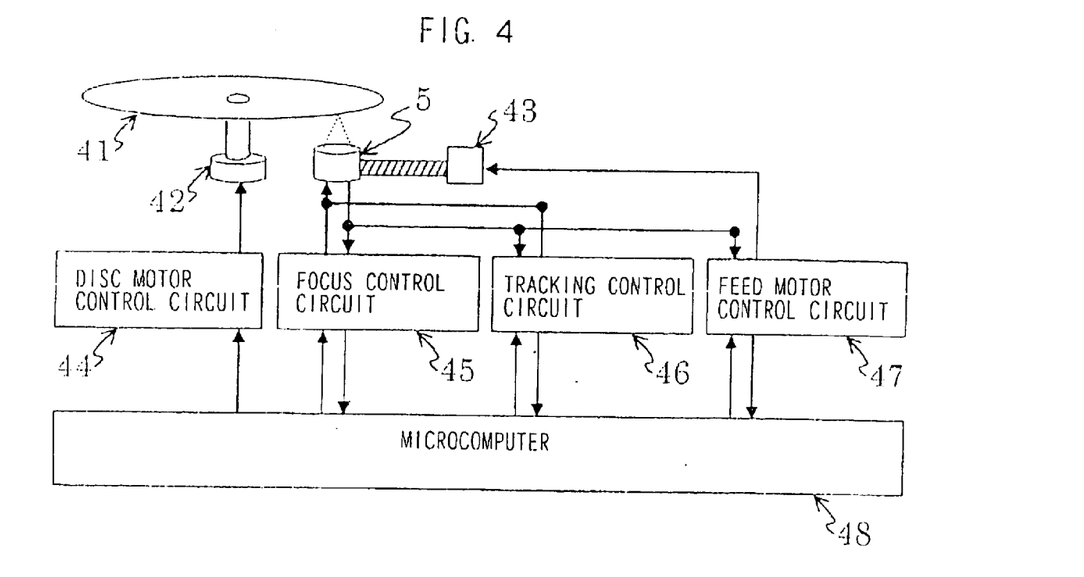
FIG. 4 is a block diagram showing a general configuration of an optical disc apparatus according to a preferred embodiment of the present invention.

FIG. 4 is a block diagram showing a general configuration of an optical disc apparatus according to the present embodiment. In FIG. 4, the reference numeral 41 denotes an optical disc inserted into the optical disc apparatus with being laid on a tray (not shown). In response to a control signal from a disc motor control circuit 44 which controls the number of revolution of the optical disc 41, a disc motor 42 rotationally drives the optical disc 41.

The reference numeral 5 denotes a pickup device, which irradiates a predetermined position of the optical disc 41 with a laser beam and detects the reflected light of the laser beam. A variety of signals detected by the pickup device 5 are inputted to a focus control circuit 45 which moves an objective lens in the direction of its optical axis to control a focus condition, a tracking control circuit 46 which moves the objective lens in a horizontal direction so as to control the tracking condition, and a feed motor control circuit 47 which moves the pickup device 5 in the horizontal direction by means of a feed motor 43, to be outputted as a variety of servo control signals.

A microcomputer 48 integrally controls the disc motor control circuit 44, the focus control circuit 45, the tracking control circuit 46 and the feed motor control circuit 47.

Next, the pickup device mounted on the optical disc apparatus according to the present embodiment will be explained.

Figure 5:
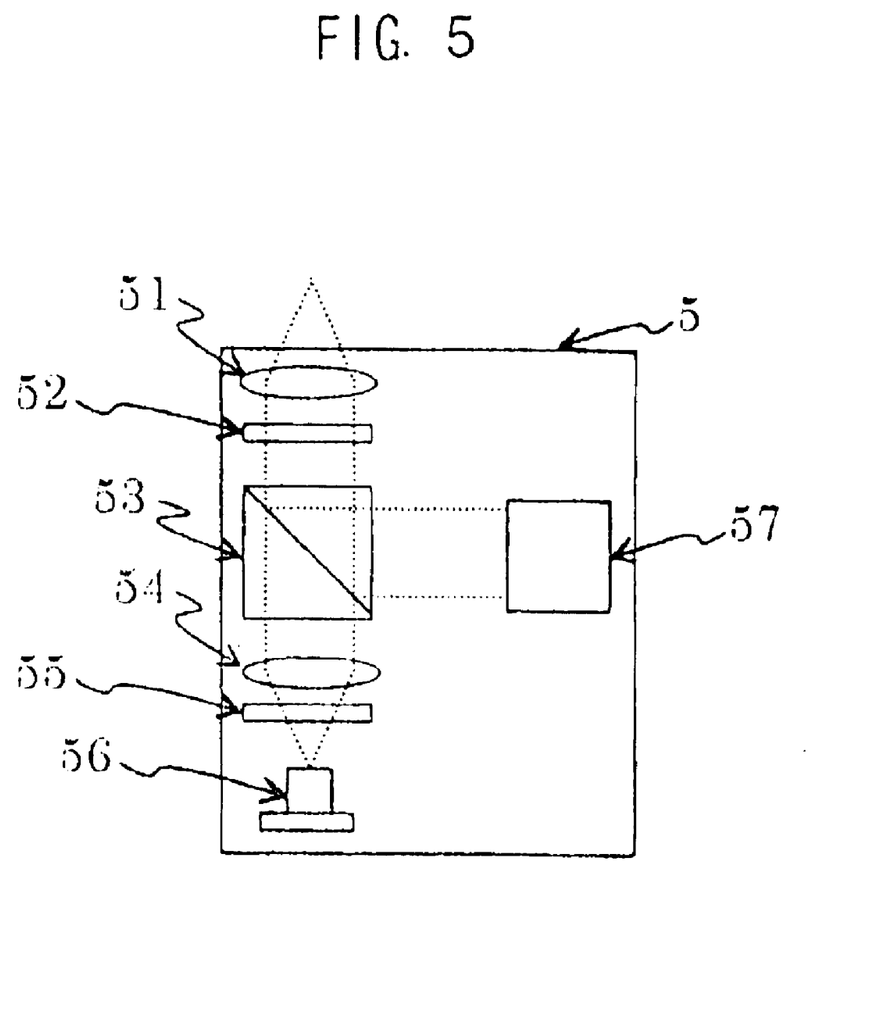
FIG. 5 is an explanatory view of a configuration of a pickup device in the optical disc apparatus according to the same embodiment.

FIG. 5 is an explanatory view of a structure of the pickup device in the optical disc apparatus of the present embodiment. In this pickup device 5, as shown in FIG. 5, the laser beam outgoing from a laser light source 56 is split into a plurality of beams by means of a diffraction grating 55. The split beams pass through a collimator lens 54 for shaping beams into parallel beams, a beam splitter 53, a quarter wavelength plate 52 and an objective lens 51 for converging beams on a disc surface, and enter a recording surface of the optical disc 41.

The incident light to the optical disc 41 is subjected to modulation by the recording surface formed on the optical disc 41 to be rendered reflected light, and the reflected light from the disc surface again passes through the objective lens 51, and the incident light and the reflected light are separated from each other by means of the quarter wavelength plate 52 and the beam splitter 53. The separated reflected light is detected by a light detector 57 which detects a focus and a tracking condition to be outputted as a variety of error signals generated thereby.

(First Embodiment)

Figure 6:
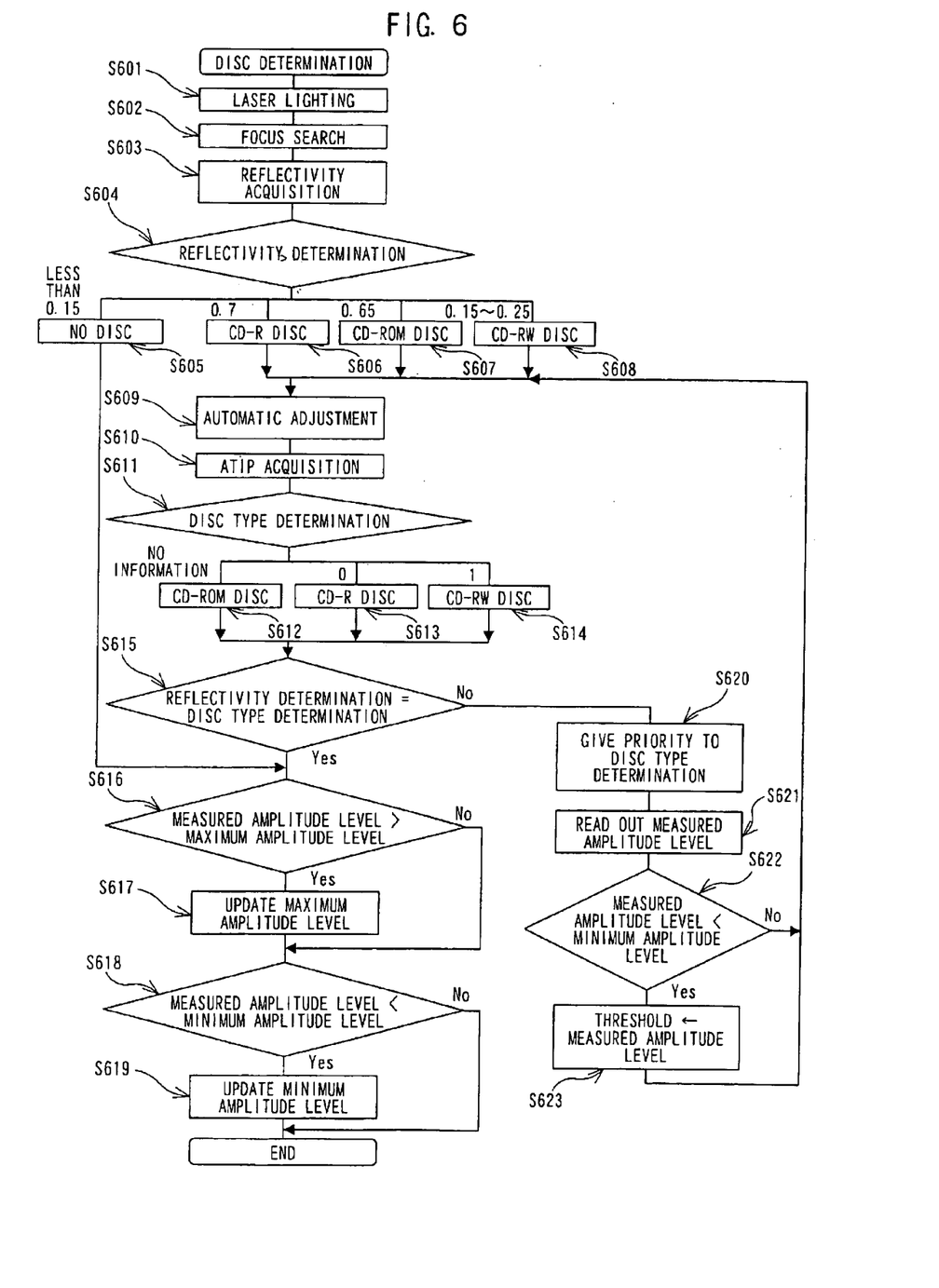
FIG. 6 is a flowchart showing an optical disc discriminating method in an optical disc apparatus according to a first embodiment of the present invention.
Figure 12:
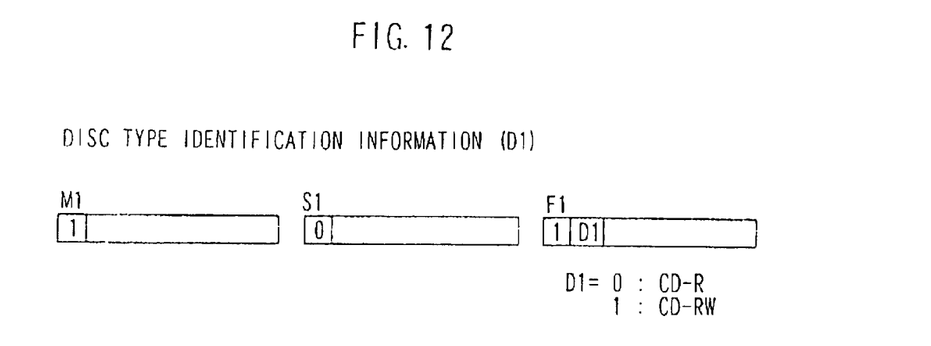
FIG. 12 is a schematic view showing disc type identification information.

In the following, an embodiment corresponding to the inventions described in Claims 1 to 6 and Claims 13 to 18 of the present invention will be explained with reference to FIGS. 6, 7 and 12.

Irradiate the optical disc 41 which has been inserted into the optical disc apparatus with being laid on a tray with a laser beam from the laser light source 56 via the objective lens 51 (S601). Thereafter, execute a focus search (S602) operation which moves the objective lens 51 in the up and down direction by means of the focus control circuit 45.

On the basis of the laser beam emitted from the laser light source 56, detect the reflected light from the recording surface of the optical disc 41 obtainable by the focus search operation with respect to the laser beam by means of the light detector 57. Acquire amplitude level of a focus error signal and sub beam addition signal generated by the light detector 57 by the microcomputer 48 via the focus control circuit 45 and the tracking control circuit 46 (S603).

The microcomputer 48 stores the acquired amplitude level in a memory (not shown) and discriminates (S604) whether the inserted optical disc 41 is a CD-ROM (S607), a CD-R (S606), a CD-RW (S608) or no disc (S605). For example, as shown in FIG. 7, if the amplitude level exceeds a certain threshold value, the disc can be discriminated as a CD-R, while on the other hand, if the amplitude level doe not exceed the threshold value, the disc can be discriminated as a CD-RW.

In accordance with the type of the optical disc 41 discriminated in the manner as described above, an automatic adjusting operation is executed so that settings of optimum values of parameters of various kinds of servo systems such as focus servo and tracking servo and a laser power are carried out (S609).

After completion of the adjusting operation for setting parameters of various kinds of servo systems and laser power, the optical disc apparatus is enabled to read out information recorded on the optical disc 41. The optical disc apparatus having become thus capable of reading out information recorded on the optical disc 41 acquires disc type identification information recorded as one of ATIP information (S610).

Discriminate whether the inserted optical disc 41 is a CD-ROM (S612), a CD-R (S613) or a CD-RW (S614) in accordance with the disc type identification information (S611). For example, as shown in FIG. 12, if the disc type identification information (D1) is "1", it can be discriminated as a CD-RW; if the disc type identification information (D1) is "0", it can discriminated as a CD-R, and if the disc type identification information itself does not exist, it can be discriminated as a CD-ROM.

In this manner, compare the type of the optical disc 41 discriminated in accordance with the amplitude level based on the focus error signal and sub beam addition signal, with the type of the optical disc 41 discriminated in accordance with the disc type identification information (S615), and if the types of the optical disc 41 discriminated respectively are the same, compare the measured amplitude level with the maximum/minimum amplitude levels in the discriminated type of the optical disc 41 (S616, S618).

On the other hand, if the measured amplitude level is larger than the maximum amplitude level in the discriminated type of the optical disc 41, the amplitude level is stored in the memory as a maximum amplitude level (S617). Similarly, if the amplitude level is smaller than the minimum amplitude level in the discriminated type of the optical disc 41, the amplitude level is stored in the memory as a minimum amplitude level (S619).

In this manner, when the types of the optical disc 41 discriminated respectively are the same, the maximum/minimum amplitude levels are discriminated in accordance with the type of the optical disc 41 to be stored and renewed in the memory.

Figure 7:
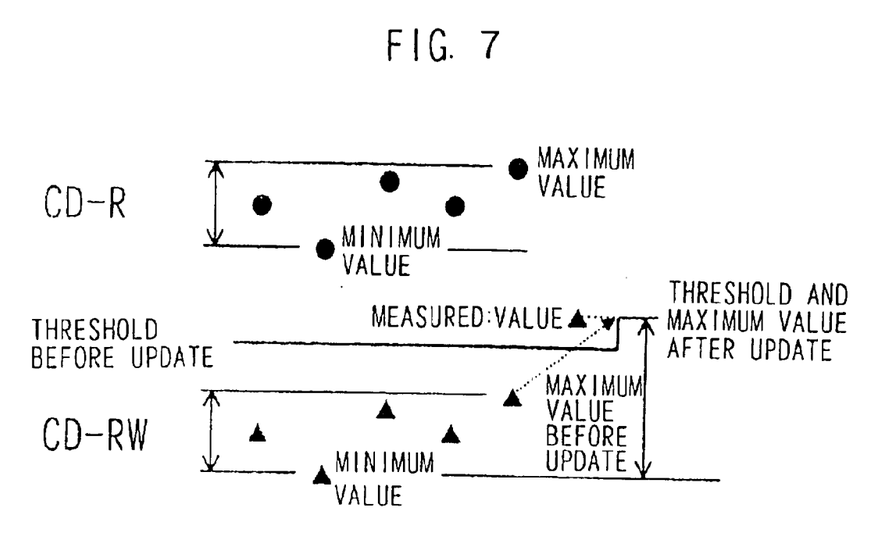
FIG. 7 is a schematic view showing an example of a discrimination operation in the optical disc apparatus according to the first embodiment.

On the other hand, if the type of the optical disc 41 discriminated in accordance with the amplitude level measured based on the focus error signal and the sub beam addition signal is different from the type of the optical disc 41 discriminated in accordance with the disc type identification information because of variations in the reflected light from the optical disc 41, for example, as shown in FIG. 7, in the case where the type of the optical disc 41 discriminated in accordance with the measured amplitude level is a CD-R, while the type of the optical disc 41 discriminated in accordance with the disc type identification information is a CD-RW, the type of the inserted optical disc 41 is determined by giving a priority to the CD-RW which is the type of the optical disc 41 discriminated in accordance with the disc type identification information (S620).

From the above different discrimination results of type of the optical disc 41, it is found that the amplitude level of quantity of reflected light used in discriminating the type of the optical disc 41, that is, the threshold value was not an effective threshold value for discriminating the type of the optical disc 41. For updating this, a threshold value of quantity of reflected light is newly calculated and set.

First, the above mentioned measured amplitude level that led the erroneous discrimination is read out from the memory into which the microcomputer 48 stored the acquired amplitude level (S621). In the memory, maximum/minimum amplitude levels in correspondence with the type of the optical disc 41 are also stored in addition to the above amplitude level. For example, as shown in FIG. 7, in the case where an amplitude level corresponding CD-R is obtained as a measured value, though the inserted optical disc is a CD-RW, the measured amplitude level corresponding to CD-R is compared with the minimum amplitude level corresponding to CD-R (S622).

If the measured amplitude level corresponding to CD-R is smaller than the minimum amplitude level corresponding to CD-R, the value of amplitude level for distinguishing CD-R from CD-RW, that is, the threshold value is raised to the value of the measured amplitude level corresponding to CD-R, thereby updating the threshold value (S623). As a consequence, it is possible to improve the accuracy of discrimination of the type of the optical disc 41 in accordance with a measured amplitude level.

In the first embodiment, the process of updating the threshold value to the measured amplitude level corresponding to CD-R (S623) was executed; however, the threshold value may be updated by such a value that is obtained by multiplying the measured amplitude level corresponding to CD-R by coefficient-times in consideration of a margin within the range of less than the minimum amplitude level corresponding to CD-R.

Furthermore, in the first embodiment, the updating process is executed in the case where an amplitude level corresponding CD-R is obtained as a measured value, though the inserted optical disc 41 is a CD-RW; however, the process may conversely update the threshold value in the case where an amplitude level corresponding to CD-RW is obtained as a measured value, though the inserted optical disc 41 is a CD-R.

Next, in accordance with the determination of the type of the inserted optical disc 41 (S620), it is necessary to change the settings of the optimum values of parameters of the various kinds of servo systems such as focus servo and tracking servo and the laser power that have been set in accordance with the type of the optical disc discriminated based on the amplitude level into the settings of optimum values of parameters of the various kinds of servo systems such as focus servo and tracking servo and a laser power in accordance with the type of the optical disc discriminated based on the disc type identification information. For this reason, the automatic adjusting operation is executed again (S609).

The optical disc apparatus having completed the adjusting operation for setting the parameters of the various kinds of servo systems and the laser power again, acquires the disc type identification information again (S610), and confirms whether an error occurs in the determination of the type of the optical disc 41 (S611) to complete the process.

Then according to the above described series of operations, in the optical disc apparatus in which the threshold value of quantity of reflected light has been updated, insert the optical disc 41 again, acquire the reflected light obtainable by the focus search (S602) operation as an amplitude level by means of the light detector 57 (S603) and discriminate the inserted optical disc 41 in accordance with the acquired measured amplitude level and the updated threshold value (S604).

In the preceding discrimination of the optical disc 41, the optical disc 41 was discriminated as a CD-R because the amplitude level exceeded the threshold value before updating, though it should essentially be discriminated as a CD-RW, however, in the discrimination of the optical disc 41 of this time, since the threshold value has been updated in accordance with the optical disc 41, it becomes possible to properly discriminate the optical disc 41 as a CD-RW, for example.

As a consequence of this, the type thus discriminated becomes correspondent with the type of the optical disc which is obtainable by discrimination in accordance with the disc type identification information that will be executed later, so that the optical disc apparatus can normally starts in a short time without executing the readjusting operation which used to hinder reduction of the startup time.

(Second Embodiment)

Figure 8:
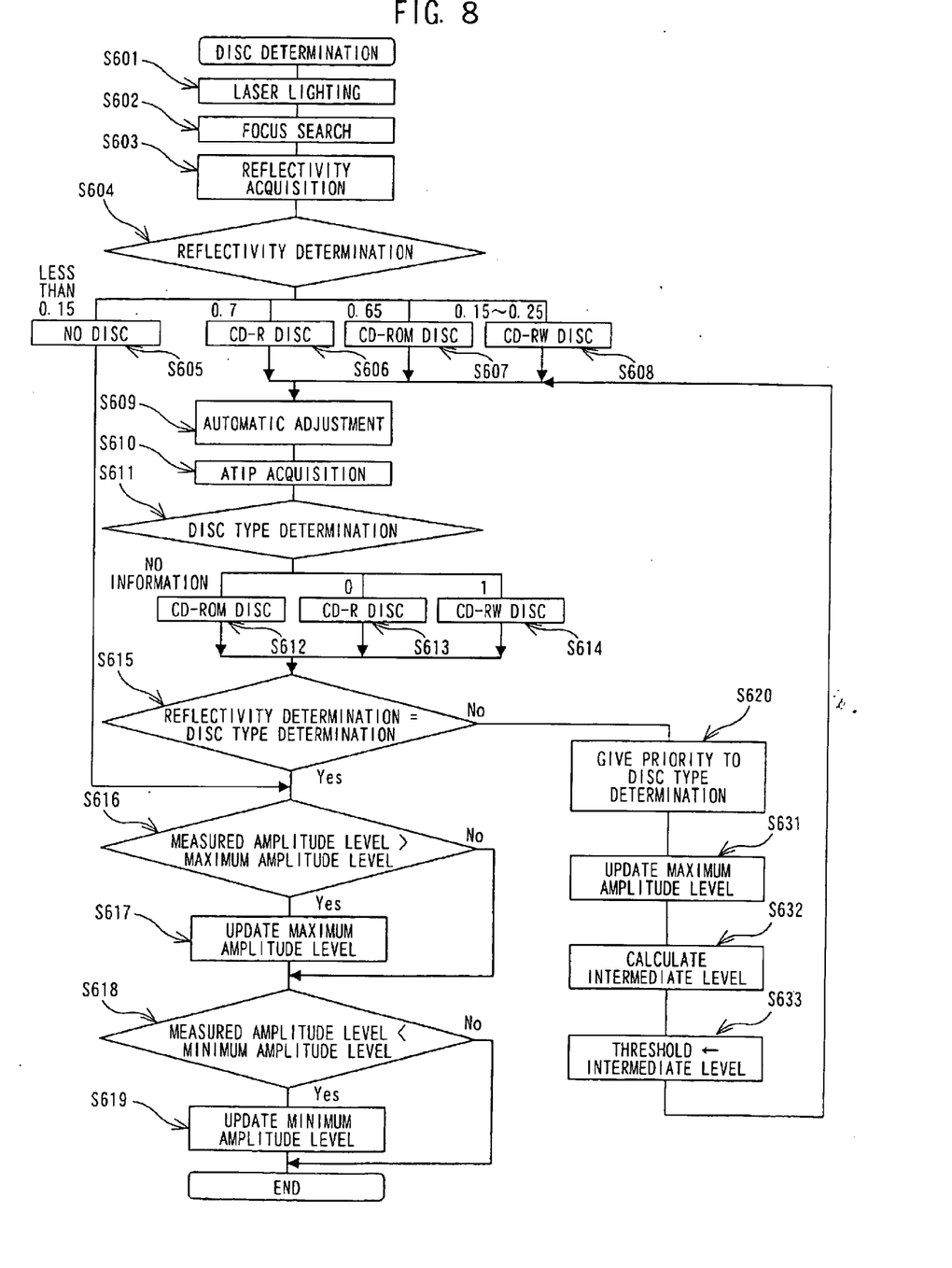
FIG. 8 is a flowchart showing an optical disc discriminating method in an optical disc apparatus according to a second embodiment of the present invention.

In the following, an embodiment corresponding to the inventions described in Claims 7 to 9 and Claims 19 to 21 of the present invention will be explained with reference to FIGS. 8 and 9. The configuration as same as that of the first embodiment as described above are denoted by the same reference numeral and explanation of which will be omitted.

In the case where the type of the optical disc 41 discriminated in accordance with the measured amplitude level differs from the type of the optical disc 41 discriminated in accordance with the disc type identification information because of variations in the reflected light from the optical disc 41, it is found that the amplitude level of quantity of reflected light used for discriminating the type of the optical disc 41, that is, the threshold value is not effective for discriminating the type of the optical disc 41. For updating this threshold value, it is necessary to calculate the threshold value of quantity of reflected light and make a setting again.

Figure 9:
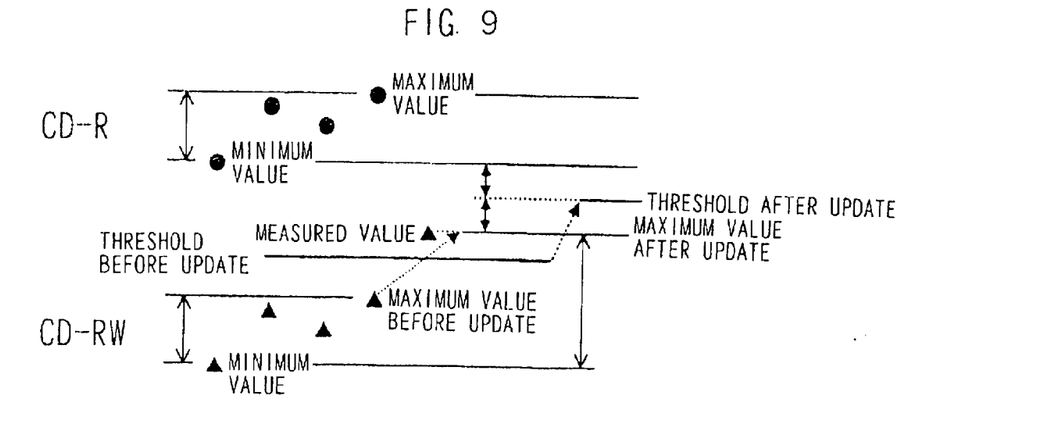
FIG. 9 is a schematic view showing an example of a discrimination operation in the optical disc apparatus according to the second embodiment.

For example, as shown in FIG. 9, in the case where an amplitude level corresponding to CD-R is obtained as a measured value, though the inserted optical disc 41 is a CD-RW, update the value of the maximum amplitude level in accordance with CD-RW to the value of the above-mentioned measured amplitude level corresponding to CD-R (S631).

From the minimum amplitude level in correspondence with CD-R and the maximum amplitude level in correspondence with CD-RW; that is, the above-mentioned measured amplitude level corresponding to CD-R, calculate an intermediate value of these amplitude levels (S632). Update the value of amplitude level for distinguishing CD-R from CD-RW, that is, the threshold value by this intermediate value (S633).

In the second embodiment, the updating process is executed in the case where an amplitude level corresponding CD-R is obtained as a measured value, though the inserted optical disc 41 is a CD-RW; however, the process may conversely update the threshold value in the case where an amplitude level corresponding to CD-RW is obtained as a measured value, though the inserted optical disc 41 is a CD-R.

Next, in accordance with the determination of the type of the inserted optical disc 41 (S620), set the parameters of various kinds of servo systems and the laser power again by automatic adjustment (S609). The optical disc apparatus having completed the adjusting operation for setting the parameters of the various kinds of servo systems and the laser power again, acquires the disc type identification information again (S610), and confirms whether an error occurs in the determination of the type of the optical disc 41 (S611) to complete the process.

Then according to the above described series of operations, in the optical disc apparatus in which the threshold value of quantity of reflected light has been updated, insert the optical disc 41 again, acquire the reflected light obtainable by the focus search (S602) operation as the measured amplitude level by means of the light detector 57 (S603) and discriminate the inserted optical disc 41 in accordance with the acquired measured amplitude level and the updated threshold value (S604).

In the preceding discrimination of the optical disc 41, the optical disc 41 was discriminated as a CD-R because the amplitude level exceeded the threshold value before updating, though it should essentially be discriminated as a CD-RW; however, in the discrimination of the optical disc 41 of this time, since the threshold value has been updated so as to correspond to CD-RW as the optical disc 41, it becomes possible to properly discriminate the optical disc 41 as a CD-RW, for example.

As a consequence of this, the type thus discriminated becomes correspondent with the type of the optical disc which is obtainable by discrimination in accordance with the disc type identification information that will be executed later, so that the optical disc apparatus can normally starts in a short time without executing the readjusting operation which used to hinder reduction of the startup time.

(Third Embodiment)

Figure 10:
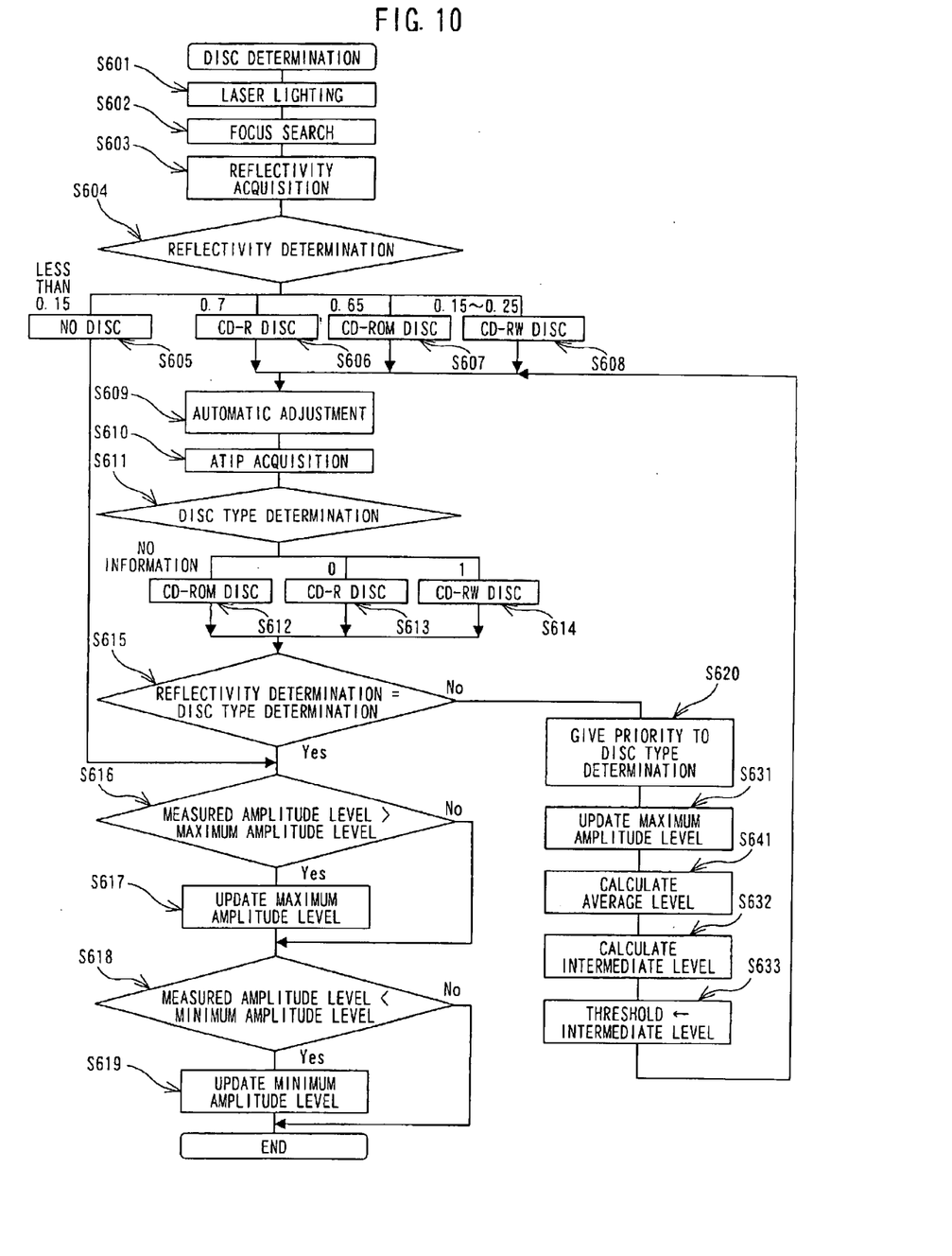
FIG. 10 is a flowchart showing an optical disc discriminating method in an optical disc apparatus according to a third embodiment of the present invention.
Figure 11:
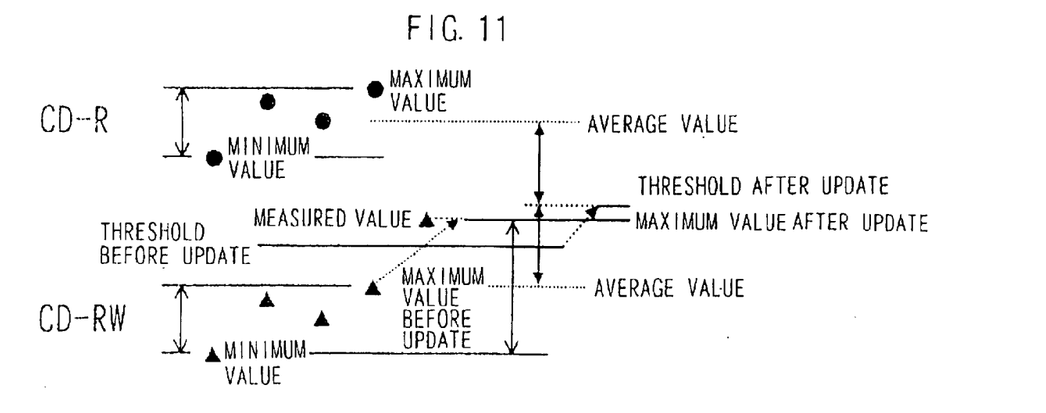
FIG. 11 is a schematic view showing an example of a discrimination operation in the optical disc apparatus according to the third embodiment.

In the following, an embodiment corresponding to the inventions described in Claims 10 to 12 and Claims 22 to 24 of the present invention will be explained with reference to FIGS. 10 and 11. The configuration as same as that of the first embodiment and the second embodiment as described above are denoted by the same reference numeral and explanation of which will be omitted.

In the case where the type of the optical disc 41 discriminated in accordance with the measured amplitude level differs from the type of the optical disc 41 discriminated in accordance with the disc type identification information because of variations in the reflected light from the optical disc 41, it is found that the amplitude level of quantity of reflected light used for discriminating the type of the optical disc 41, that is, the threshold value is not effective for discriminating the type of the optical disc 41.

For updating this threshold value, it is necessary to calculate the threshold value of quantity of reflected light and make a setting again. For example, as shown in FIG. 11, in the case where an amplitude level corresponding to CD-R is obtained as a measured value, though the inserted optical disc 41 is a CD-RW, update the value of the maximum amplitude level in accordance with CD-RW to the value of the above-mentioned measured amplitude level corresponding to CD-R (S631).

Then, calculate an average value including the updated maximum amplitude level in correspondence with CD-RW (S641), calculate an intermediate value of average amplitude levels from an average value of amplitude level in correspondence with CD-R and an average value of amplitude level in correspondence with CD-RW (S632), and update the value of amplitude level for distinguishing CD-R from CD-RW, that is, the threshold value by this intermediate value (S633).

In the third embodiment, the updating process is executed in the case where an amplitude level corresponding CD-R is obtained as a measured value, though the inserted optical disc 41 is a CD-RW; however, the process may conversely update the threshold value in the case where an amplitude level corresponding to CD-RW is obtained as a measured value, though the inserted optical disc 41 is a CD-R.

Next, in accordance with the determination of the type of the inserted optical disc 41 (S620), set the parameters of various kinds of servo systems and the laser power again by automatic adjustment (S609). The optical disc apparatus having completed the adjusting operation for setting the parameters of the various kinds of servo systems and the laser power again, acquires the disc type identification information again (S610), and confirms whether an error occurs in the determination of the type of the optical disc 41 (S611) to complete the process.

Then according to the above described series of operations, in the optical disc apparatus in which the threshold value of quantity of reflected light has been updated, insert the optical disc 41 again, acquire the reflected light obtainable by the focus search (S602) operation as an amplitude level by means of the light detector 57 (S603) and discriminate the inserted optical disc 41 in accordance with the acquired measured amplitude level and the updated threshold value (S604).

In the preceding discrimination of the optical disc 41, the optical disc 41 was discriminated as a CD-R because the amplitude level exceeded the threshold value before updating, though it should essentially be discriminated as a CD-RW; however, in the discrimination of the optical disc 41 of this time, since the threshold value has been updated so as to correspond to the optical disc 41, it becomes possible to properly discriminate the optical disc 41 as a CD-RW, for example.

As a consequence of this, the type thus discriminated becomes correspondent with the type of the optical disc which is obtainable by discrimination in accordance with the disc type identification information that will be executed later, so that the optical disc apparatus can normally starts in a short time without executing the readjusting operation which used to hinder reduction of the startup time.

What is claimed is:

1. An optical disc apparatus comprising:
    a laser light source for emitting a laser beam for irradiating an optical disc surface via an objective lens;
    a light detector for detecting reflected light of the laser beam emitted from said laser light source and reflected by said optical disc surface;
    a focus controller for controlling a focus condition by moving said objective lens in a direction of an optical axis in accordance with a focus error signal generated by said light detector;
    a tracking controller for controlling a tracking condition by moving said objective lens in a horizontal direction in accordance with a tracking error signal generated by said light detector;
    a disc signal discriminator for discriminating a type of said optical disc on a basis of a focus error signal and a sub beam addition signal obtainable in performing a focus search by moving said objective lens in the direction of optical axis by means of said focus controller; and
    a disc information discriminator for discriminating the type of said optical disc in accordance with information recorded on said optical disc,
    wherein final discrimination of the type of said optical disc is made on a basis of the type discrimination result of said optical disc by means of said disc signal discriminator and the type discrimination result of said optical disc by means of said disc information discriminator,
    wherein with regard to a loaded optical disc, in the case where the type of optical disc discriminated by the disc signal discriminator and the type of optical disc discriminated by the disc information discriminator differ from each other, a priority is given to the type of optical disc discriminated by said disc information discriminator,
    wherein when the type of optical disc discriminated by the disc information discriminator is discriminated as the type of the optical disc inserted into the optical disc apparatus, a signal level obtained by the disc signal discriminator is adopted as a threshold value for discriminating the type of the optical disc used in said disc signal discriminator.

2. The optical disc apparatus according to claim 1, wherein the disc signal discriminator is for using a signal level of the focus error signal and the sub beam addition signal as threshold data of quantity of reflected light for discriminating the type of the optical disc.

3. The optical disc apparatus according to claim 1, wherein the disc signal discriminator is for discriminating whether the optical disc to be discriminated based on the focus error signal and the sub beam addition signal is a CD-ROM, a CD-R, a CD-RW or no disc.

4. The optical disc apparatus according to claim 1, wherein the disc information discriminator is for discriminating whether the optical disc to be discriminated based on the information recorded on the optical disc is a CD-R, a CD-RW, or a CD-ROM.

5. The optical disc apparatus according to claim 1, wherein when the type of optical disc discriminated by the disc information discriminator is discriminated as the type of the optical disc inserted into the optical disc apparatus, an intermediate value between a maximum value of one of the signal levels of optical disc and a minimum value of the other of the signal levels of optical disc obtained by the disc signal discriminator is adopted as a threshold value for discriminating the type of the optical disc used in said disc signal discriminator.

6. The optical disc apparatus according to claim 5, wherein the maximum value of one of the signal levels of optical disc obtained by the disc signal discriminator is used as a maximum value of signal levels in the type of optical disc discriminated by said disc information discriminator.

7. The optical disc apparatus according to claim 5, wherein the minimum value of the other of the signal levels of optical disc obtained by the disc signal discriminator is used as a minimum value of signal levels in the other type of optical disc not discriminated by said disc information discriminator.

8. The optical disc apparatus according to claim 1, wherein when the type of optical disc discriminated by the disc information discriminator is discriminated as the type of the optical disc inserted into the optical disc apparatus, an intermediate value between an average value of signal levels in one type of optical disc discriminated by said disc information discriminator and an average value of signal levels in the other type of optical disc discriminated by the disc signal discriminator is adopted as a threshold value for discriminating the type of the optical disc used in said disc signal discriminator.

9. The optical disc apparatus according to claim 8, wherein the average value of signal levels in the type of optical disc discriminated by the disc signal discriminator is determined by averaging a plurality of signal levels obtained in the type of optical disc discriminated by said disc signal discriminator.

10. The optical disc apparatus according to claim 8, wherein the average value of signal levels in the type of optical disc discriminated by the disc information discriminator is determined by averaging a plurality of signal levels obtained by the disc signal discriminator in the type of optical disc discriminated by said disc information discriminator.

11. An optical disc discriminating method in an optical disc apparatus according to claim 1,
    wherein final discrimination of the type of said optical disc is made on the basis of the type discrimination result of said optical disc by means of the disc signal discriminator which discriminates the type of said optical disc on the basis of the focus error signal and a sub beam addition signal obtainable in performing a focus search by moving an objective lens in a direction of optical axis, and the type discrimination result of said optical disc by disc information discriminator which discriminates the type of said optical disc in accordance with information recorded on said optical disc, wherein with regard to a loaded optical disc, if the type of optical disc discriminated by the disc signal discriminator and the type of optical disc discriminated by the disc information discriminator differ from each other, a priority is given to the type of optical disc discriminated by said disc information discriminator, wherein when the type of optical disc discriminated by the disc information discriminator is discriminated as the type of the optical disc inserted into the optical disc apparatus, the signal levels obtained by the disc signal discriminator are adopted as threshold values for discriminating the type of the optical disc used in said disc signal discriminator.

12. The optical disc discriminating method according to claim 11, wherein in discriminating the type of optical disc by the disc signal discriminator, signal levels of the focus error signal and the sub beam addition signal are used as threshold data of quantity of reflected light for discriminating the type of said optical disc.

13. The optical disc discriminating method according to claim 11, wherein in discriminating the type of optical disc by the disc signal discriminator, the optical disc to be discriminated based on the focus error signal and the sub beam addition signal is discriminated whether it is a CD-ROM, a CD-R, a CD-RW or no disc.

14. The optical disc discriminating method according to claim 11, wherein in discriminating the type of optical disc by the disc information discriminator, the optical disc to be discriminated based on the information recorded on the optical disc is discriminated whether it is a CD-R, a CD-RW, or a CD-ROM.

15. The optical disc discriminating method according to claim 11, wherein when the type of optical disc discriminated by the disc information discriminator is discriminated as the type of the optical disc inserted into the optical disc apparatus, an intermediate value between a maximum value of one of the signal levels and a minimum value of the other of the signal levels obtained by the disc signal discriminator is adopted as a threshold value for discriminating the type of the optical disc used in said disc signal discriminator.

16. The optical disc discriminating method according to claim 15, wherein the maximum value of one of the signal levels obtained by the disc signal discriminator is used as a maximum value of the signal levels in the type of optical disc discriminated by said disc information discriminator.

17. The optical disc discriminating method according to claim 15, wherein the minimum value of the other of the signal levels obtained by the disc signal discriminator is used as a minimum value of signal levels in the other type of optical disc not discriminated by said disc information discriminator.

18. The optical disc discriminating method according to claim 11, wherein when the type of optical disc discriminated by the disc information discriminator is discriminated as the type of the optical disc inserted into the optical disc apparatus, an intermediate value between an average value of signal levels in one type of optical disc discriminated by said disc information discriminator and an average value of signal levels in the other type of optical disc discriminated by the disc signal discriminator is adopted as a threshold value for discriminating the type of the optical disc used in said disc signal discriminator.

19. The optical disc discriminating method according to claim 18, wherein the average value of signal levels in the type of optical disc discriminated by the disc signal discriminator is determined by averaging a plurality of signal levels obtained in the type of optical disc discriminated by said disc signal discriminator.

20. The optical disc discriminating method according to claim 18, wherein the average value of signal levels in the type of optical disc discriminated by the disc information discriminator is determined by averaging a plurality of signal levels obtained by the disc signal discriminator in the type of optical disc discriminated by said disc information discriminator.

* * * * *